(12) United States Patent
Sakhnini et al.

(10) Patent No.: US 12,376,012 B2
(45) Date of Patent: Jul. 29, 2025

(54) CONFIGURING ONE OR MORE TYPES OF INITIAL ACCESS OR CELL RESELECTION

(71) Applicant: QUALCOMM Incorporated, San Diego, CA (US)

(72) Inventors: Iyab Issam Sakhnini, San Diego, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 17/658,904

(22) Filed: Apr. 12, 2022

(65) Prior Publication Data

US 2023/0328634 A1  Oct. 12, 2023

(51) Int. Cl.
| | |
|---|---|
| *G06F 15/16* | (2006.01) |
| *G06F 9/54* | (2006.01) |
| *H04L 5/00* | (2006.01) |
| *H04L 29/06* | (2006.01) |
| *H04W 36/00* | (2009.01) |
| *H04W 48/16* | (2009.01) |

(52) U.S. Cl.
CPC ........... *H04W 48/16* (2013.01); *H04L 5/0053* (2013.01); *H04W 36/0072* (2013.01)

(58) Field of Classification Search
CPC ............. H04W 48/16; H04W 36/0072; H04W 74/0833
USPC ....................................................... 380/272
See application file for complete search history.

(56) References Cited

U.S. PATENT DOCUMENTS

| | | | |
|---|---|---|---|
| 11,689,999 B2* | 6/2023 | Park | H04W 72/04 |
| | | | 455/434 |
| 12,167,286 B2* | 12/2024 | Cui | H04W 48/16 |
| 12,167,317 B2* | 12/2024 | Tseng | H04W 72/21 |
| 2016/0080133 A1* | 3/2016 | Golitschek Edler von Elbwart | ... |
| | | | H04W 76/28 |
| | | | 370/280 |
| 2016/0234858 A1* | 8/2016 | Bao | H04W 72/1268 |
| 2020/0329410 A1* | 10/2020 | Hong | H04W 4/44 |
| 2021/0051672 A1* | 2/2021 | Rastegardoost | H04W 74/006 |
| 2021/0084603 A1* | 3/2021 | Zisimopoulos | H04W 36/04 |
| 2021/0099924 A1* | 4/2021 | Shih | H04W 36/0061 |
| 2021/0321397 A1* | 10/2021 | Abedini | H04W 16/14 |
| 2021/0392534 A1* | 12/2021 | Kim | H04W 74/004 |

(Continued)

FOREIGN PATENT DOCUMENTS

| | | |
|---|---|---|
| EP | 3937571 A1 | 1/2022 |
| WO | WO-2021211879 | 10/2021 |
| WO | WO-2022022636 A1 | 2/2022 |

OTHER PUBLICATIONS

International Search Report and Written Opinion—PCT/US2023/064422—ISA/EPO—May 24, 2023.

(Continued)

*Primary Examiner* — Hamza N Algibhah

(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration that indicates one or more types associated with an initial access or a cell reselection. The UE may perform, to the network entity, the initial access or the cell reselection based at least in part on the configuration. Numerous other aspects are described.

30 Claims, 10 Drawing Sheets

(56) References Cited

U.S. PATENT DOCUMENTS

| | | | | |
|---|---|---|---|---|
| 2022/0007271 | A1* | 1/2022 | Breuer | H04W 48/08 |
| 2022/0053433 | A1* | 2/2022 | Abedini | H04L 5/0051 |
| 2022/0095181 | A1* | 3/2022 | Parichehrehteroujeni | H04W 36/0058 |
| 2022/0110035 | A1* | 4/2022 | Liberg | G01S 5/14 |
| 2022/0225189 | A1* | 7/2022 | Kang | H04W 36/13 |
| 2022/0264385 | A1* | 8/2022 | Hong | H04W 36/0058 |
| 2023/0056855 | A1* | 2/2023 | Jiang | H04W 36/302 |
| 2023/0072951 | A1* | 3/2023 | Zhang | H04W 72/0453 |
| 2024/0049086 | A1* | 2/2024 | Ishii | H04W 36/0072 |
| 2024/0089820 | A1* | 3/2024 | Mattam | H04W 36/14 |
| 2024/0179582 | A1* | 5/2024 | Li | H04W 48/12 |
| 2024/0314845 | A1* | 9/2024 | Liu | H04W 48/18 |
| 2024/0357449 | A1* | 10/2024 | Li | H04W 36/0058 |
| 2024/0372661 | A1* | 11/2024 | Park | H04L 5/0044 |
| 2024/0381192 | A1* | 11/2024 | Hong | H04W 36/0061 |
| 2024/0381245 | A1* | 11/2024 | Liu | H04W 48/20 |
| 2024/0389014 | A1* | 11/2024 | Li | H04W 48/20 |
| 2024/0414634 | A1* | 12/2024 | Hu | H04L 5/005 |
| 2024/0414716 | A1* | 12/2024 | Lin | H04L 1/1671 |

OTHER PUBLICATIONS

Qualcomm Incorporated: "Ue Complexity Reduction for NR RedCap Devices", 3GPP TSG-RAN WG1 Meeting #103, R1-2008620, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, XP051940246, pp. 1-21, p. 3, paragraph 2.1.

* cited by examiner

CONFIGURING ONE OR MORE TYPES OF INITIAL ACCESS OR CELL RESELECTION

FIELD OF THE DISCLOSURE

Aspects of the present disclosure generally relate to wireless communication and to techniques and apparatuses for configuring one or more types of initial access or cell reselection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network entity, a configuration that indicates one or more types associated with an initial access or a cell reselection; and perform, to the network entity, the initial access or the cell reselection based at least in part on the configuration.

In some implementations, an apparatus for wireless communication at a network entity includes a memory and one or more processors, coupled to the memory, configured to: transmit, to a UE, a configuration that indicates one or more types associated with an initial access or a cell reselection; and perform, for the UE, the initial access or the cell reselection based at least in part on the configuration.

In some implementations, a method of wireless communication performed by a UE includes receiving, from a network entity, a configuration that indicates one or more types associated with an initial access or a cell reselection; and performing, to the network entity, the initial access or the cell reselection based at least in part on the configuration.

In some implementations, a method of wireless communication performed by a network entity includes transmitting, to a UE, a configuration that indicates one or more types associated with an initial access or a cell reselection; and performing, for the UE, the initial access or the cell reselection based at least in part on the configuration.

In some implementations, a non-transitory computer-readable medium storing a set of instructions for wireless communication includes one or more instructions that, when executed by one or more processors of a UE, cause the UE to: receive, from a network entity, a configuration that indicates one or more types associated with an initial access or a cell reselection; and perform, to the network entity, the initial access or the cell reselection based at least in part on the configuration.

In some implementations, a non-transitory computer-readable medium storing a set of instructions for wireless communication includes one or more instructions that, when executed by one or more processors of a network entity, cause the network entity to: transmit, to a UE, a configuration that indicates one or more types associated with an initial access or a cell reselection; and perform, for the UE, the initial access or the cell reselection based at least in part on the configuration.

In some implementations, an apparatus for wireless communication includes means for receiving, from a network entity, a configuration that indicates one or more types associated with an initial access or a cell reselection; and means for performing, to the network entity, the initial access or the cell reselection based at least in part on the configuration.

In some implementations, an apparatus for wireless communication includes means for transmitting, to a UE, a configuration that indicates one or more types associated with an initial access or a cell reselection; and means for performing, for the UE, the initial access or the cell reselection based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
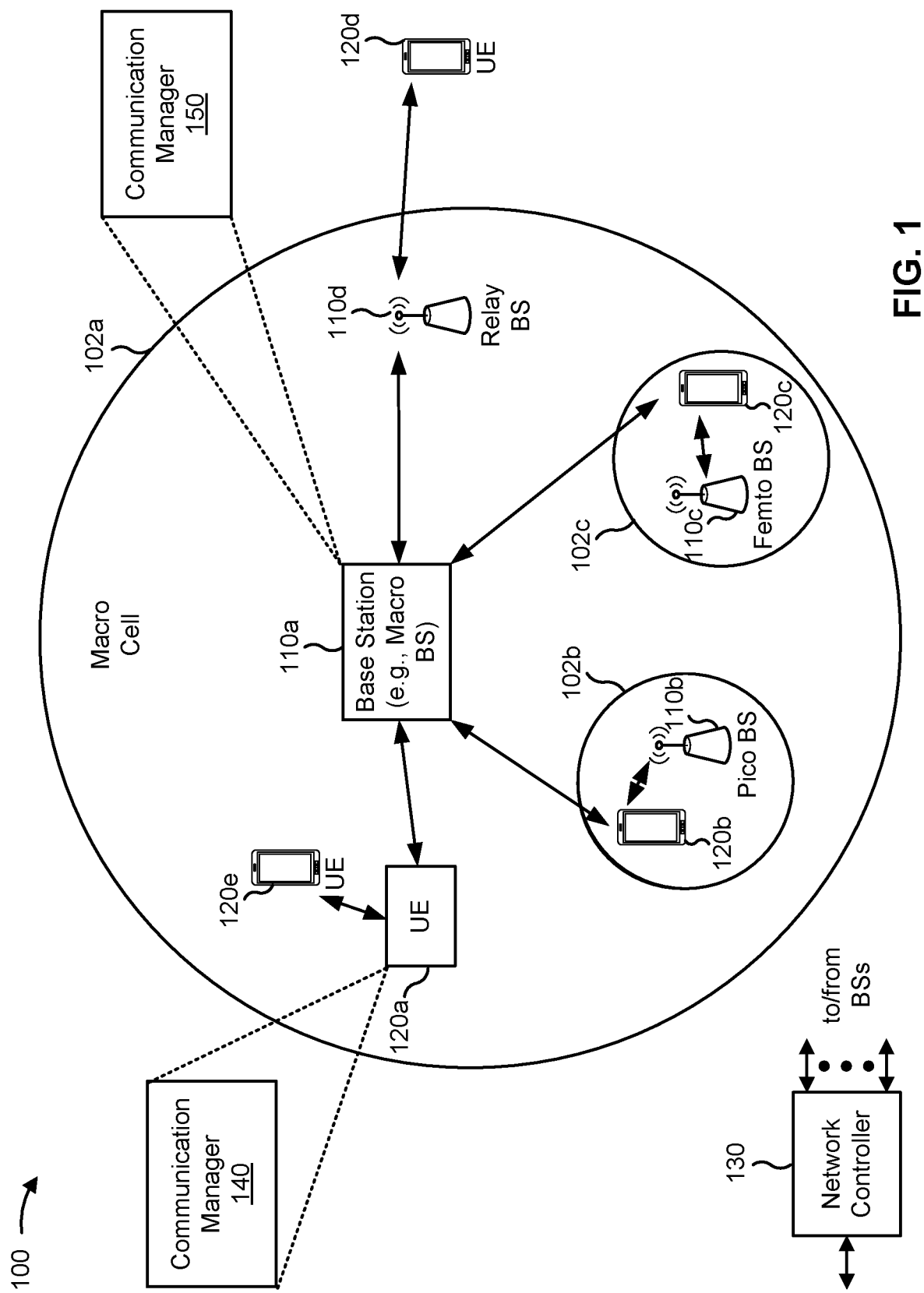
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a configuration that indicates one or more types associated with an initial access or a cell reselection; and perform, to the network entity, the initial access or the cell reselection based at least in part on the configuration. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a configuration that indicates one or more types associated with an initial access or a cell reselection; and perform, for the UE, the initial access or the cell reselection based at least in part on the configuration. Additionally, or alternatively, the communication manager 150 may perform one or more other operations described herein.

As indicated above, FIG. 1 is provided as an example. Other examples may differ from what is described with regard to FIG. 1.

Figure 2:
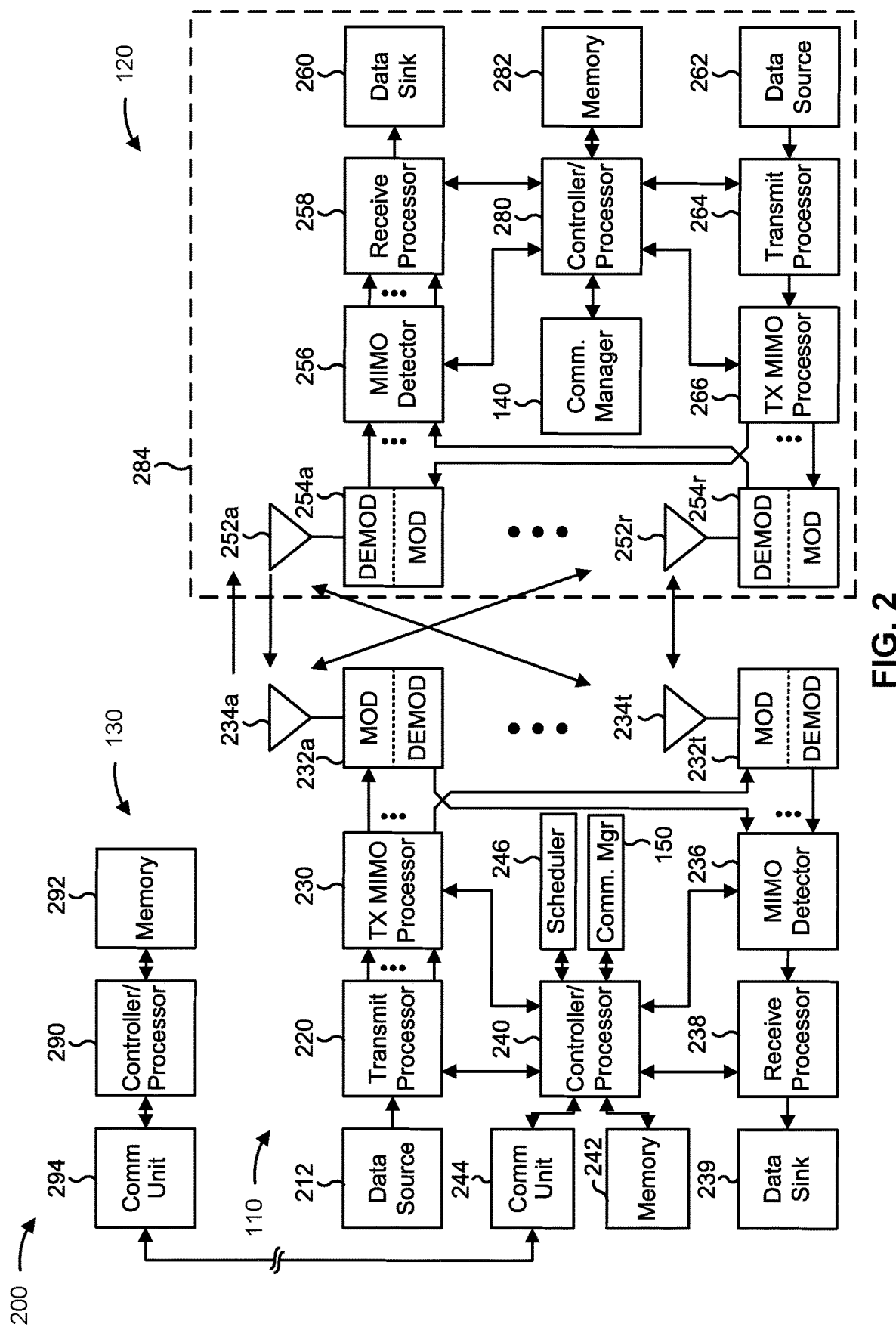
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with configuring one or more types of initial access or cell reselection, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a configuration that indicates one or more types associated with an initial access or a cell reselection; and/or means for performing, to the network entity, the initial access or the cell reselection based at least in part on the configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a UE, a configuration that indicates one or more types associated with an initial access or a cell reselection; and/or means for performing, for the UE, the initial access or the cell reselection based at least in part on the configuration. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
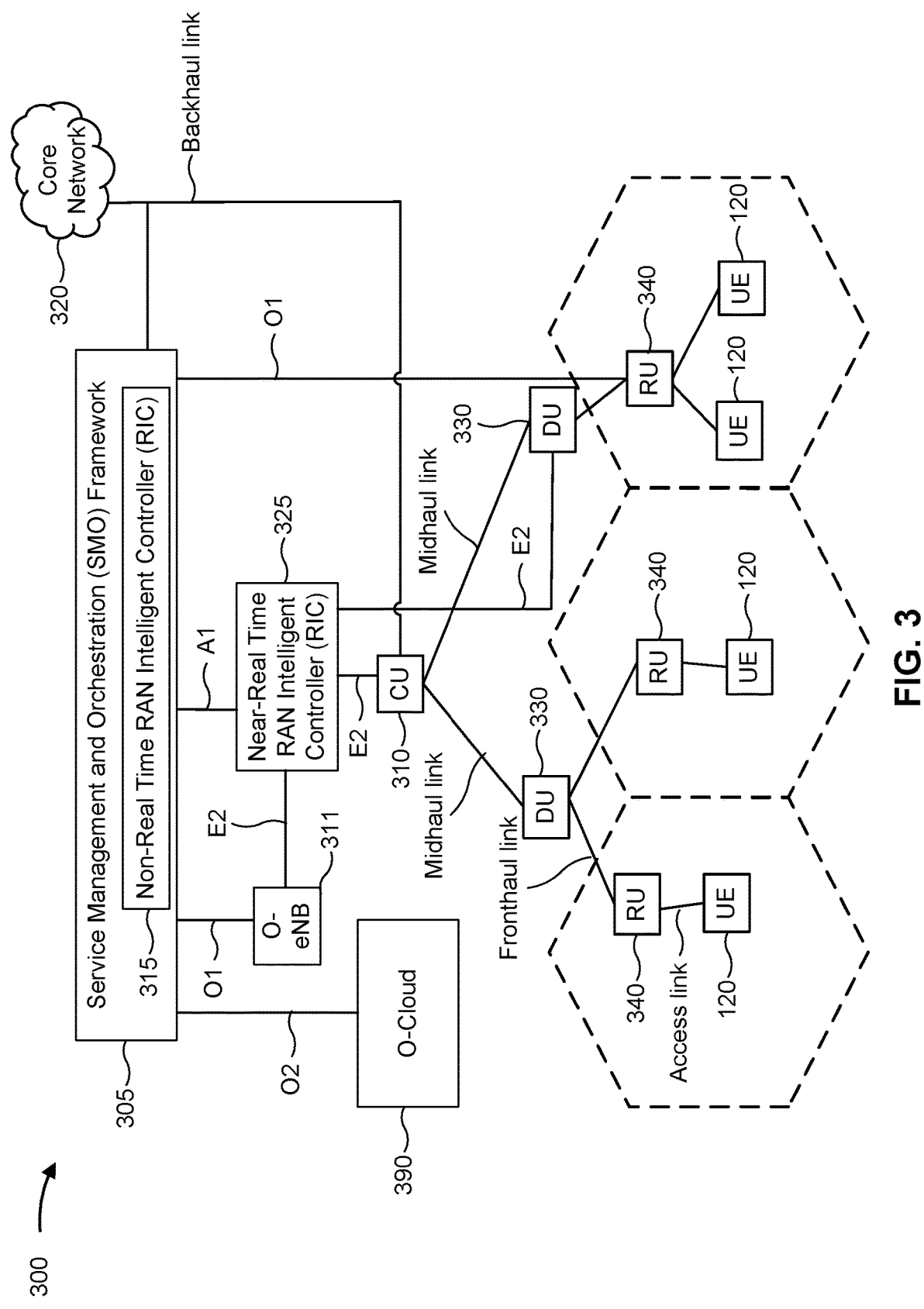
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access and backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a near real time RAN (Near-RT RIC) 325 via an E2 link, or a non-real time RAN (Non-RT RIC) 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Sixth generation (6G) wireless systems may consider an mmW redesign. Some challenges expected for 6G wireless systems include path loss in mmWave bands, blockage from objects (e.g., hands, body, or foliage), the smartphone form factor, maximum permissible exposure requirements, beam pairing, beam tracking, beam recovery, densification of networks, and/or power efficiency. To address these challenges, new designs are being considered for low latency and overhead beam management (e.g., autonomous beam management), seamless mobility across nodes (e.g., gNBs, relays, and repeaters), topology enhancements for densifying networks, power efficient RF front-ends and beamforming, waveform and modulation for improved power efficiency, usage of different bands (e.g., sub-THz), uplink coverage enhancements, power savings for the UE and gNB, power efficient physical layer operations and procedures, and/or sidelink operation enhancements.

Figure 4:
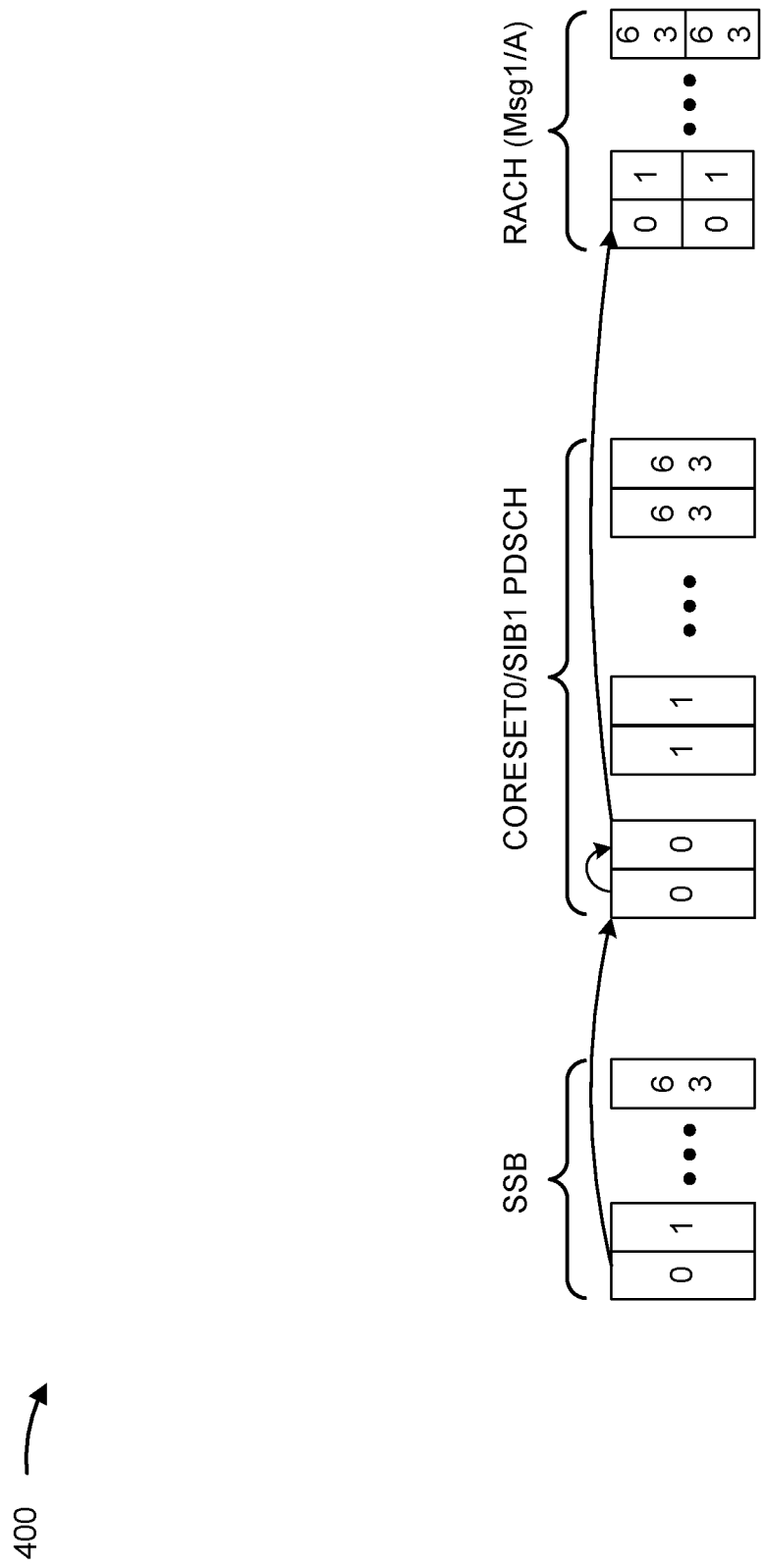
FIG. 4 is a diagram illustrating an example of an initial access, in accordance with the present disclosure.

FIG. 4 is a diagram illustrating an example 400 of an initial access, in accordance with the present disclosure.

As shown in FIG. 4, in a 5G NR system, during an initial access, a network entity may transmit up to 64 synchronization signal block (SSB) beams. The network entity may transmit the SSB beams using time division multiplexing (TDM). The network entity may transmit the SSB beams based at least in part on a beam sweep. During a cell search, a UE may detect one of the SSB beams. In other words, the UE may detect an SSB from a certain beam. A master information block (MIB) associated with the SIB may configure a control resource set (CORESET) 0 and a search space set type 0. The network entity may transmit a downlink control information (DCI) (e.g., DCI format 1_0) based at least in part on the CORESET 0 and the search space set type 0, where the DCI may be cyclic redundancy check (CRC) scrambled by a system information radio network temporary identifier (SI-RNTI). The network entity may transmit the DCI via a physical downlink shared channel (PDSCH). The UE may detect the DCI. The DCI may schedule remaining minimum system information (RMSI), which may include a system information block type 1 (SIB1) (e.g., a SIB1 PDSCH). The SIB1 may configure a random access channel (RACH). The UE may transmit a RACH message to the network entity on a RACH occasion based at least in part on the SIB1, where the RACH occasion may be configured by the network entity. The RACH message may be a message 1 (Msg1) or message A (MsgA) of a RACH procedure. The UE may access the network entity based at least in part on the RACH procedure.

As indicated above, FIG. 4 is provided as an example. Other examples may differ from what is described with regard to FIG. 4.

The 5G NR system may support up to 64 SSBs, up to 64 CORESET 0s, up to 64 SIB1 PDSCH s, and up to 64 RACHs. In other words, an SSB, a CORESET 0, a SIB1 PDSCH, and a RACH may be per beam, and resources may be reserved per beam. In other words, a plurality of initial access channels and messages (e.g., all initial access channels or messages) may be repeated per beam, with up to 64 separate beams, which may contribute to an initial access overhead.

As an example, the 5GNR system may be a 400 MHz system with a subcarrier spacing (SCS) of 120 kHz. The 5GNR system may employ 64 wide beams. The 5GNR system may provide a CORESET 0, which may be associated with one OFDM symbol and 48 resource blocks (RBs). The 5GNR system may provide a SIB1 PDSCH, which may be associated with 7 OFDM symbols and 48 RBs. The 5G NR system may employ a RACH, where 6 OFDM symbols may be per RACH occasion, two RACH occasions may be per slot, and a one-to-one SSB to resource occasion mapping may occur. In the 5GNR system may, a periodicity for an SSB, the CORESET 0, the SIB1 PDSCH, and the RACH may be 20 ms. The 5GNR system may employ a time division duplexing (TDD) configuration of "DDDSU", where "D" represents a downlink slot, "S" represents a special slot, and "U" indicates an uplink slot. In this example, the SSB may consume about 1.1% of available downlink resources, the CORESET 0 may consume about 1.3% of the available downlink resources, and the SIB1 PDSCH may consume about 4.6% of the available downlink resources. The RACH may consume about 3.7% of available uplink resources. An initial access (e.g., SSB, CORESET 0, SIB1 PDSCH, and RACH) may consume about 7% of a total downlink, and the initial access may consume about 6.2% of a total downlink and uplink. Thus, the initial access may cause a considerable amount of overhead for the 5G NR system.

To address this overhead issue, in an initial access, a network entity may transmit a dedicated CORESET 0 and/or a dedicated SIB1 PDSCH. The network entity may transmit the dedicated CORESET 0 and/or the dedicated SIB1 PDSCH based at least in part on a request received from a UE. The network entity may transmit the dedicated CORESET 0 and/or the dedicated SIB1 PDSCH on an on-demand basis. For example, the network entity may transmit a plurality of SSB beams. The UE may detect one of the SSB beams. In other words, the UE may detect an SSB from a certain beam. The UE may transmit, to the network entity, a RACH message using that beam, and the RACH message may indicate the request. The network entity may transmit the dedicated SIB1 PDSCH based at least in part on the request indicated in the RACH message. The network may transmit the SIB1 PDSCH only on the beam used by the UE. By transmitting the SIB1 PDSCH only the beam used by the UE, a SIB1 PDSCH overhead may be reduced from consuming 4.6% of available downlink resources to consuming 0.1% of available downlink resources. Further, an initial access overhead may be reduced from consuming 7% of a total downlink to consuming 2.5% of a total downlink.

In an initial access that supports the dedicated SIB, some resources may need to be preconfigured or specified. For example, RACH resources, which typically are indicated by the SIB1 PDSCH, may need to be preconfigured or specified because the RACH message may indicate the request for the SIB1 PDSCH. In other words, the RACH message may occur in time before the SIB1 PDSCH, so the SIB1 cannot indicate the RACH resources, and instead the RACH resources may need to be preconfigured or specified. Further, a MIB may not be able to indicate the RACH resources. When some resources need to be preconfigured or specified in a static manner due to the usage of the dedicated SIB1 PDSCH, a configuration flexibility for the resources may be reduced, since the network entity may not be able to flexibly select the resources.

In some cases, the configuration flexibility for some resources (e.g., RACH resources) may be less important. For example, in a limited deployment (e.g., a controlled/static factory setting or private network), the configuration flexibility for the resources may be less important due to a predictability associated with the limited deployment. In other cases, the configuration flexibility for the resources may be more important. For example, in a dynamic urban deployment in which a quantity of UEs in an area is difficult to predict, the configuration flexibility for the resources may be more important. Further, depending on a quantity of beams and/or initial access overhead, adapting the dedicated SIB1 PDSCH may be preferred over a traditional SIB1 PDSCH (e.g., a non-dedicated SIB1 PDSCH), or vice versa. However, the UE may be unable to support different types of initial access (e.g., initial access with the dedicated SIB1 PDSCH versus initial access without the dedicated SIB1 PDSCH) depending on a deployment associated with the UE.

In various aspects of techniques and apparatuses described herein, a UE may receive, from a network entity, a configuration that indicates one or more types associated with an initial access or a cell reselection. The one or more types may include a first type and a second type. The first type may be associated with a flexible configuration for one or more channels, where the flexible configuration may be associated with dynamic resources for the one or more channels. The second type may be associated with a static configuration for the one or more channels, where the static configuration may be associated with preconfigured or specified resources for the one or more channels. The one or more channels may include a RACH, a physical downlink control channel (PDCCH), and/or a SIB1 PDSCH. The UE may perform, to the network entity, the initial access or the cell reselection based at least in part on the configuration. Thus, the UE may be able to support both the first type and the second type based at least in part on the configuration received from the network entity, and the UE may select between the first type and the second type when performing the initial access or the cell reselection. In other words, the UE may perform the initial access or the cell reselection using the first type, or the UE may perform the initial access or the cell reselection using the second type, which may depend on a deployment (e.g., a limited deployment versus a dynamic urban deployment) associated with the UE.

Figure 5:
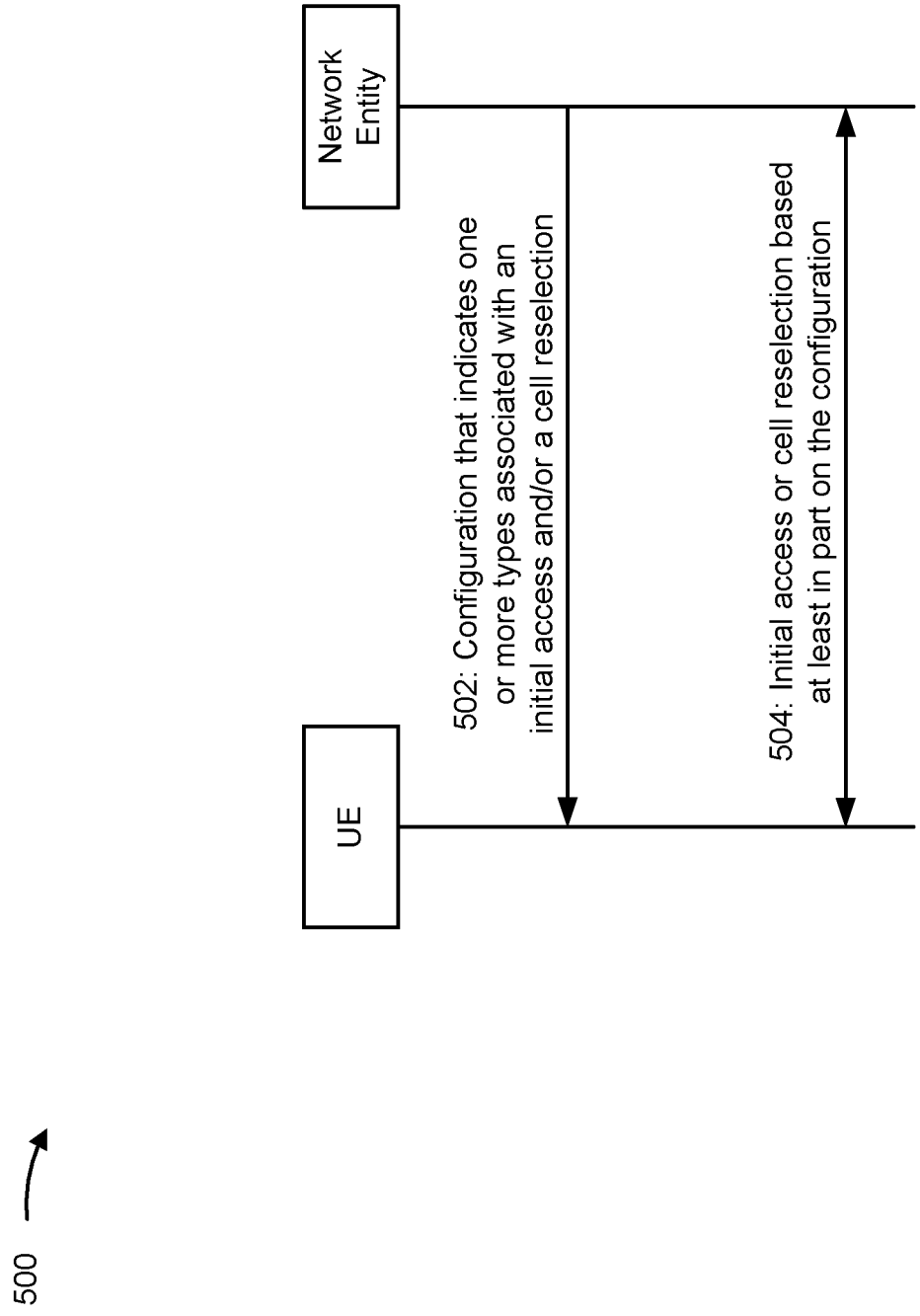
FIGS. 5-6 are diagrams illustrating examples associated with configuring one or more types of initial access or cell reselection, in accordance with the present disclosure.

FIG. 5 is a diagram illustrating an example 500 associated with configuring one or more types of initial access or cell reselection, in accordance with the present disclosure. As shown in FIG. 5, example 500 includes communication between a UE (e.g., UE 120) and a network entity (e.g., base station 110). In some aspects, the UE and the base station may be included in a wireless network, such as wireless network 100.

As shown by reference number 502, the UE may receive, from the network entity, a configuration that indicates one or more types associated with an initial access and/or a cell reselection. The one or more types may include a first type associated with a flexible configuration for one or more channels. The flexible configuration may be associated with dynamic resources for the one or more channels. The one or more types may include a second type associated with a static configuration for the one or more channels. The static configuration may be associated with preconfigured or specified resources for the one or more channels. The one or more channels, for either the first type or the second type, may include a RACH, a PDCCH, and/or a SIB1 PDSCH. The RACH may be a PRACH.

In some aspects, the network entity may configure/indicate, to the UE, multiple types of initial access and/or cell reselection. A Type 1 may involve the flexible configuration for the RACH, the PDCCH, and/or the SIB1 PDSCH. The flexible configuration may be associated with dynamic resources for transmissions via the RACH, the PDCCH, and/or the SIB1 PDSCH, which may occur during the initial access and/or the cell reselection. A Type 2 may involve the static configuration for the RACH, the PDCCH, and/or the SIB1 PDSCH. The static configuration may be associated with preconfigured and/or specified resources for transmissions via the RACH, the PDCCH, and/or the SIB1 PDSCH, which may occur during the initial access and/or the cell reselection.

In some aspects, the configuration may indicate, for the one or more types associated with the initial access or the cell reselection, a type of system information. The type of system information may be fully static system information that involves no SIB1, partially static system information that involves a partial SIB1, or flexible system information that involves a full SIB1. In other words, for Type 1 and Type 2, the network entity may configure/indicate, to the UE, fully static system information (e.g., no SIB1), partly static system information (e.g., a light SIB1), or flexible system information (e.g., a full SIB1).

In some aspects, the configuration may indicate, for the one or more types associated with the initial access or the cell reselection, a non-dedicated CORESET 0 and a non-dedicated SIB1 PDSCH that is periodically transmitted by the network entity. The configuration may indicate, for the one or more types associated with the initial access or the cell reselection, a non-dedicated CORESET 0 and a dedicated SIB1 PDSCH. The configuration may indicate, for the one or more types associated with the initial access or the cell reselection, a dedicated CORESET 0 and a dedicated SIB1 PDSCH. In other words, for Type 1 and Type 2, the network entity may configure/indicate, to the UE, a normal CORESET 0 and a normal SIB1 PDSCH (which may be periodically transmitted), a normal CORESET 0 and the dedicated SIB1 PDSCH, or the dedicated CORESET 0 and dedicated SIB1 PDSCH.

In some aspects, the UE may receive the configuration from the network entity via an SSB (e.g., a MIB or a DMRS), a CORESET, system information (e.g., for cell reselection), or dedicated signaling (e.g., for another cell). In some cases, the configuration may be implicit. For example, the configuration may be associated with a frequency, such as a cell frequency or an SSB frequency. In some aspects, the one or more types associated with the initial access or the cell reselection may be based at least in part on a UE capability. The UE may transmit, to the network entity, capability signaling that indicates the UE capability, and the network entity may transmit the configuration based at least in part the UE capability. In some aspects, the one or more types associated with the initial access or the cell reselection may be applicable to a plurality of UEs. The UE capability and the plurality of UEs may be applicable in an inter-cell scenario, in which UEs move between cells, and certain UEs support some of the types and other UEs do not support some of the types.

As shown by reference number 504, the UE may perform, to the network entity, the initial access or the cell reselection based at least in part on the configuration. When performing the initial access or the cell reselection, the UE may perform transmissions via the RACH, the PDCCH, and/or the SIB1 PDSCH. The UE may perform the initial access or the cell reselection in accordance with the first type or the second type. In other words, the UE may perform the initial access or the cell reselection using the flexible configuration, which may be associated with flexible resources for the RACH, the PDCCH, and/or the SIB1 PDSCH. Alternatively, the UE may perform the initial access or the cell reselection using the static configuration, which may be associated with preconfigured or specified resources for the RACH, the PDCCH, and/or the SIB1 PDSCH.

In some aspects, the UE may store information indicating a deployment associated with the UE. The information may indicate that the UE is associated with a limited deployment (e.g., a controlled/static factory setting or private network). The information may indicate that the UE is associated with a dynamic urban deployment. Depending on the information that indicates the deployment associated with the UE, and the configuration received from the network entity that configures the one or more types associated with the initial access or the cell reselection, the UE may perform the initial access or the cell reselection. For example, when the UE is associated with the dynamic urban deployment, the UE may perform the initial access or the cell reselection using the first type associated with the flexible configuration. For example, when the UE is associated with the limited deployment, the UE may perform the initial access or the cell reselection using the second type associated with the static configuration.

As indicated above, FIG. 5 is provided as an example. Other examples may differ from what is described with regard to FIG. 5.

Figure 6:
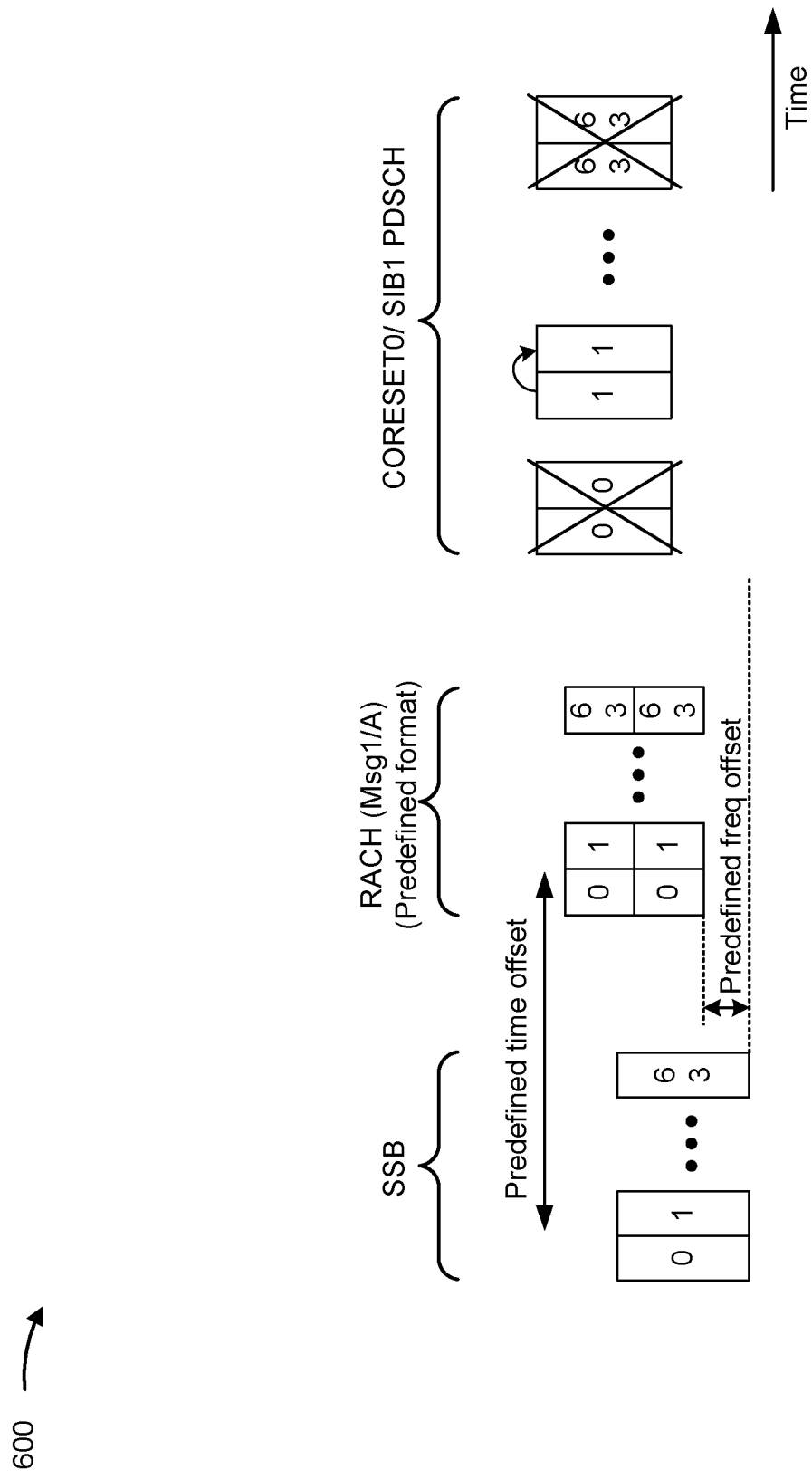

FIG. 6 is a diagram illustrating an example 600 associated with configuring one or more types of initial access or cell reselection, in accordance with the present disclosure.

As shown by FIG. 6, as part of an initial access, a UE may receive, from a network entity, an SSB via certain beam. A predefined RACH may be based at least in part on a predefined time offset from the SSB received by the UE, and the predefined RACH may be based at least in part on a predefined frequency offset from the SSB received by the UE. The predefined RACH may be associated with a static configuration. The UE may transmit, to the network entity a RACH message (e.g., Msg1 or MsgA having a predefined format) with a request during the predefined RACH. The network entity may transmit, to the UE and based at least in part on the request, a dedicated CORESET 0 and a dedicated SIB1 PDSCH. The network entity may not transmit a plurality of CORESET 0s and SIB1 PDSCHs (e.g., 64 CORESET 0s and 64 SIB1 PDSCHs), but rather may only transmit the dedicated CORESET 0 and the dedicated SIB1 PDSCH to the UE. Thus, in this example, the UE may perform the initial access based at least in part on the predefined RACH, the dedicated CORESET 0, and the dedicated SIB1 PDSCH using the static configuration.

In some aspects, the UE may not transmit the RACH message, but rather may transmit some other uplink message with the request to the network entity. The UE may transmit the uplink message based at least in part on the static configuration, where a resource for the uplink message may be based at least in part on the predefined time offset from the SSB and the predefined frequency offset from the SSB.

As indicated above, FIG. 6 is provided as an example. Other examples may differ from what is described with regard to FIG. 6.

Figure 7:
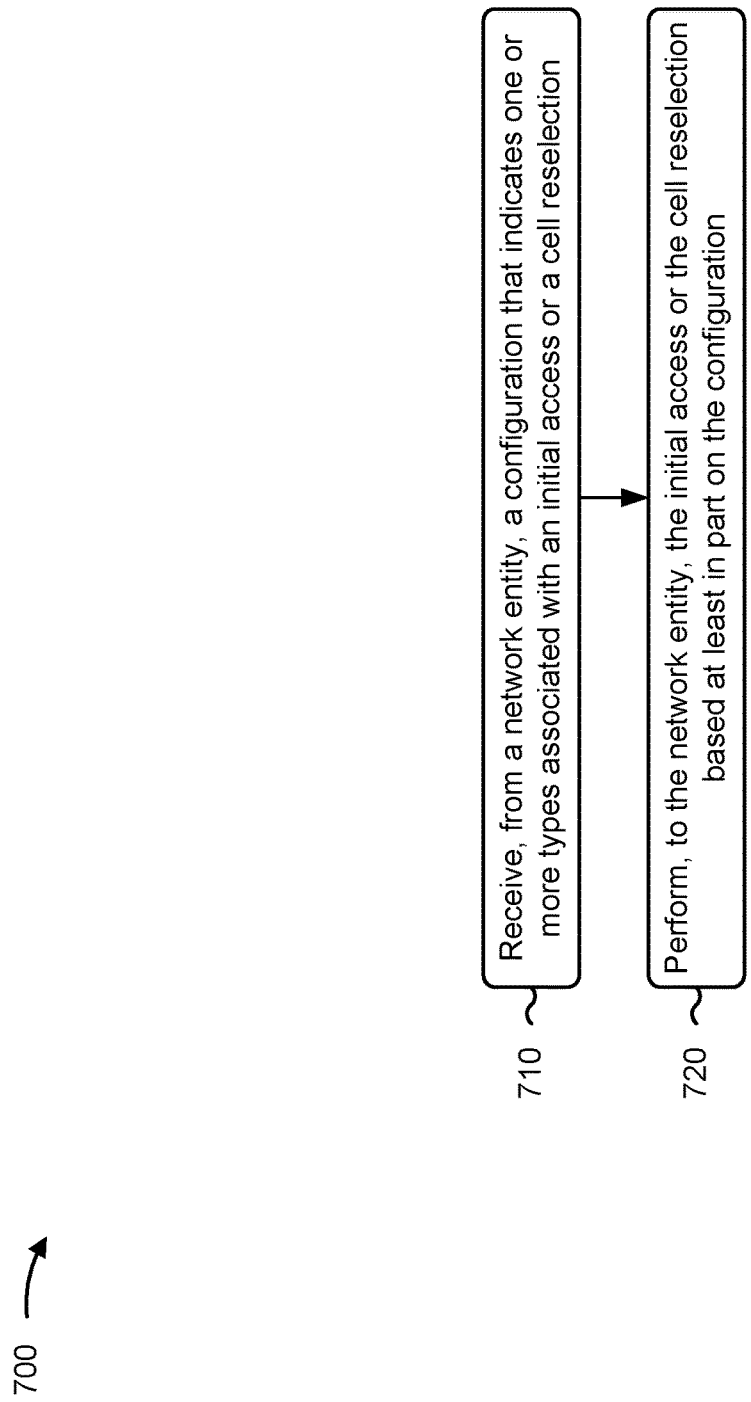
FIGS. 7-8 are diagrams illustrating example processes associated with configuring one or more types of initial access or cell reselection, in accordance with the present disclosure.

FIG. 7 is a diagram illustrating an example process 700 performed, for example, by a UE, in accordance with the present disclosure. Example process 700 is an example where the UE (e.g., UE 120) performs operations associated with configuring one or more types of initial access or cell reselection.

As shown in FIG. 7, in some aspects, process 700 may include receiving, from a network entity, a configuration that indicates one or more types associated with an initial access or a cell reselection (block 710). For example, the UE (e.g., using communication manager 140 and/or reception component 902, depicted in FIG. 9) may receive, from a network entity, a configuration that indicates one or more types associated with an initial access or a cell reselection, as described above.

As further shown in FIG. 7, in some aspects, process 700 may include performing, to the network entity, the initial access or the cell reselection based at least in part on the configuration (block 720). For example, the UE (e.g., using communication manager 140 and/or performance component 908, depicted in FIG. 9) may perform, to the network entity, the initial access or the cell reselection based at least in part on the configuration, as described above.

Process 700 may include additional aspects, such as any single aspect or any combination of aspects described below and/or in connection with one or more other processes described elsewhere herein.

In a first aspect, the one or more types includes a first type associated with a flexible configuration for one or more channels, wherein the flexible configuration is associated with dynamic resources for the one or more channels, and the one or more types includes a second type associated with a static configuration for the one or more channels, wherein the static configuration is associated with preconfigured or specified resources for the one or more channels.

In a second aspect, alone or in combination with the first aspect, the one or more channels include a PRACH, a PDCCH, or a SIB1 PDSCH.

In a third aspect, alone or in combination with one or more of the first and second aspects, the configuration indicates, for the one or more types associated with the initial access or the cell reselection, a type of system information.

In a fourth aspect, alone or in combination with one or more of the first through third aspects, the type of system information is one of fully system information that involves no SIB1, partially static system information that involves a partial SIB1, or flexible system information that involves a full SIB1.

In a fifth aspect, alone or in combination with one or more of the first through fourth aspects, the configuration indicates, for the one or more types associated with the initial access or the cell reselection, a non-dedicated CORESET 0 and a non-dedicated SIB1 PDSCH that is periodically transmitted by the network entity.

In a sixth aspect, alone or in combination with one or more of the first through fifth aspects, the configuration indicates, for the one or more types associated with the initial access or the cell reselection, a non-dedicated CORESET 0 and a dedicated SIB1 PDSCH.

In a seventh aspect, alone or in combination with one or more of the first through sixth aspects, the configuration indicates, for the one or more types associated with the initial access or the cell reselection, a dedicated CORESET 0 and a dedicated SIB1 PDSCH.

In an eighth aspect, alone or in combination with one or more of the first through seventh aspects, the configuration is received from the network entity via one of an SSB, a CORESET, system information, or dedicated signaling.

In a ninth aspect, alone or in combination with one or more of the first through eighth aspects, the one or more types associated with the initial access or the cell reselection are based at least in part on a UE capability.

In a tenth aspect, alone or in combination with one or more of the first through ninth aspects, the one or more types associated with the initial access or the cell reselection are applicable to a plurality of UEs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
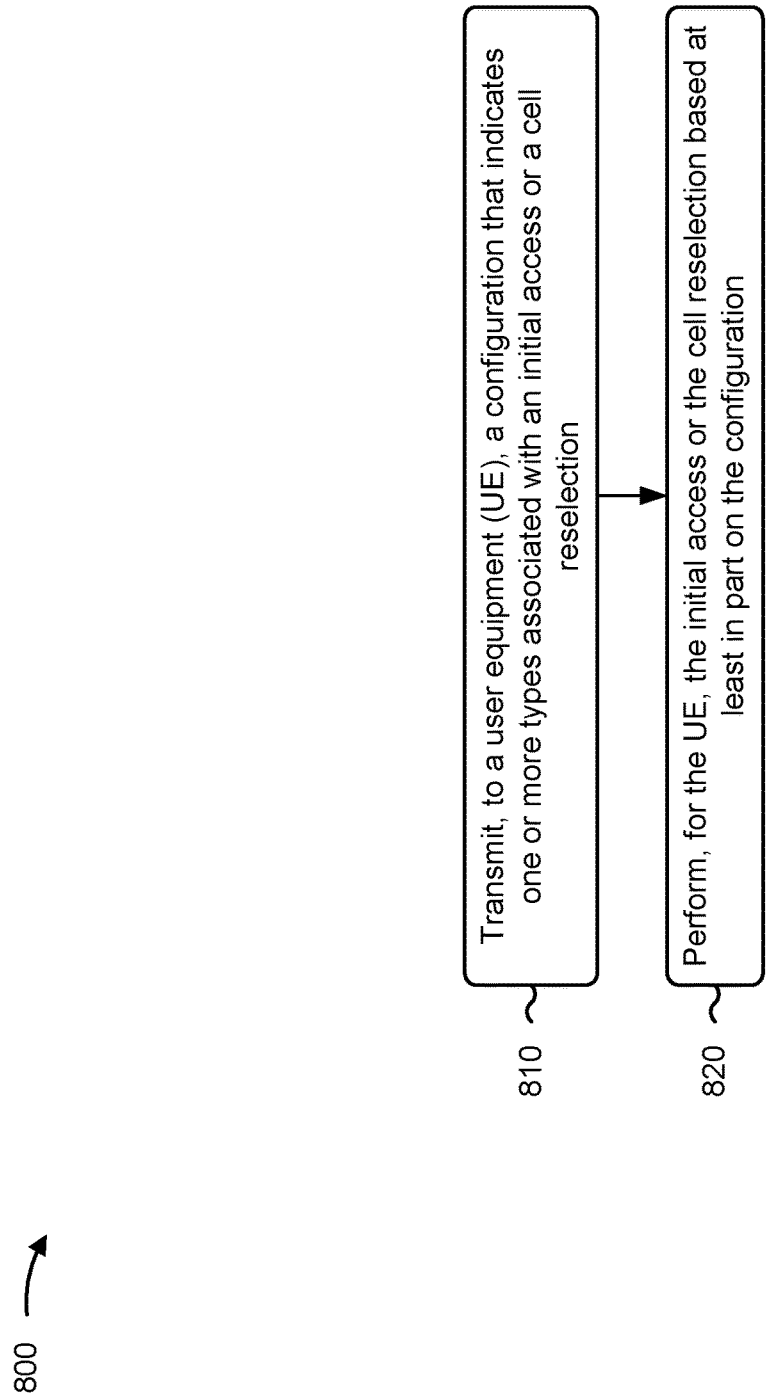

FIG. 8 is a diagram illustrating an example process 800 performed, for example, by a network entity, in accordance with the present disclosure. Example process 800 is an example where the network entity (e.g., base station 110) performs operations associated with configuring one or more types of initial access or cell reselection.

As shown in FIG. 8, in some aspects, process 800 may include transmitting, to a UE, a configuration that indicates one or more types associated with an initial access or a cell reselection (block 810). For example, the network entity (e.g., using communication manager 150 and/or transmission component 1004, depicted in FIG. 10) may transmit, to a UE, a configuration that indicates one or more types associated with an initial access or a cell reselection, as described above.

As further shown in FIG. 8, in some aspects, process 800 may include performing, for the UE, the initial access or the cell reselection based at least in part on the configuration (block 820). For example, the network entity (e.g., using communication manager 150 and/or performance component 1008, depicted in FIG. 10) may perform, for the UE, the initial access or the cell reselection based at least in part on the configuration, as described above.

Process 800 may include additional aspects, such as any single aspect or any combination of aspects described below and/or in connection with one or more other processes described elsewhere herein.

In a first aspect, the one or more types includes a first type associated with a flexible configuration for one or more channels, wherein the flexible configuration is associated with dynamic resources for the one or more channels, and the one or more types includes a second type associated with a static configuration for the one or more channels, wherein the static configuration is associated with preconfigured or specified resources for the one or more channels.

In a second aspect, alone or in combination with the first aspect, the one or more channels include a RACH, a PDCCH, or a SIB1 PDSCH.

In a third aspect, alone or in combination with one or more of the first and second aspects, the configuration indicates, for the one or more types associated with the initial access or the cell reselection, a non-dedicated CORESET 0 and a non-dedicated SIB1 PDSCH that is periodically transmitted by the network entity, a non-dedicated CORESET 0 and a dedicated PDSCH, or a dedicated CORESET 0 and a dedicated SIB1 PDSCH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
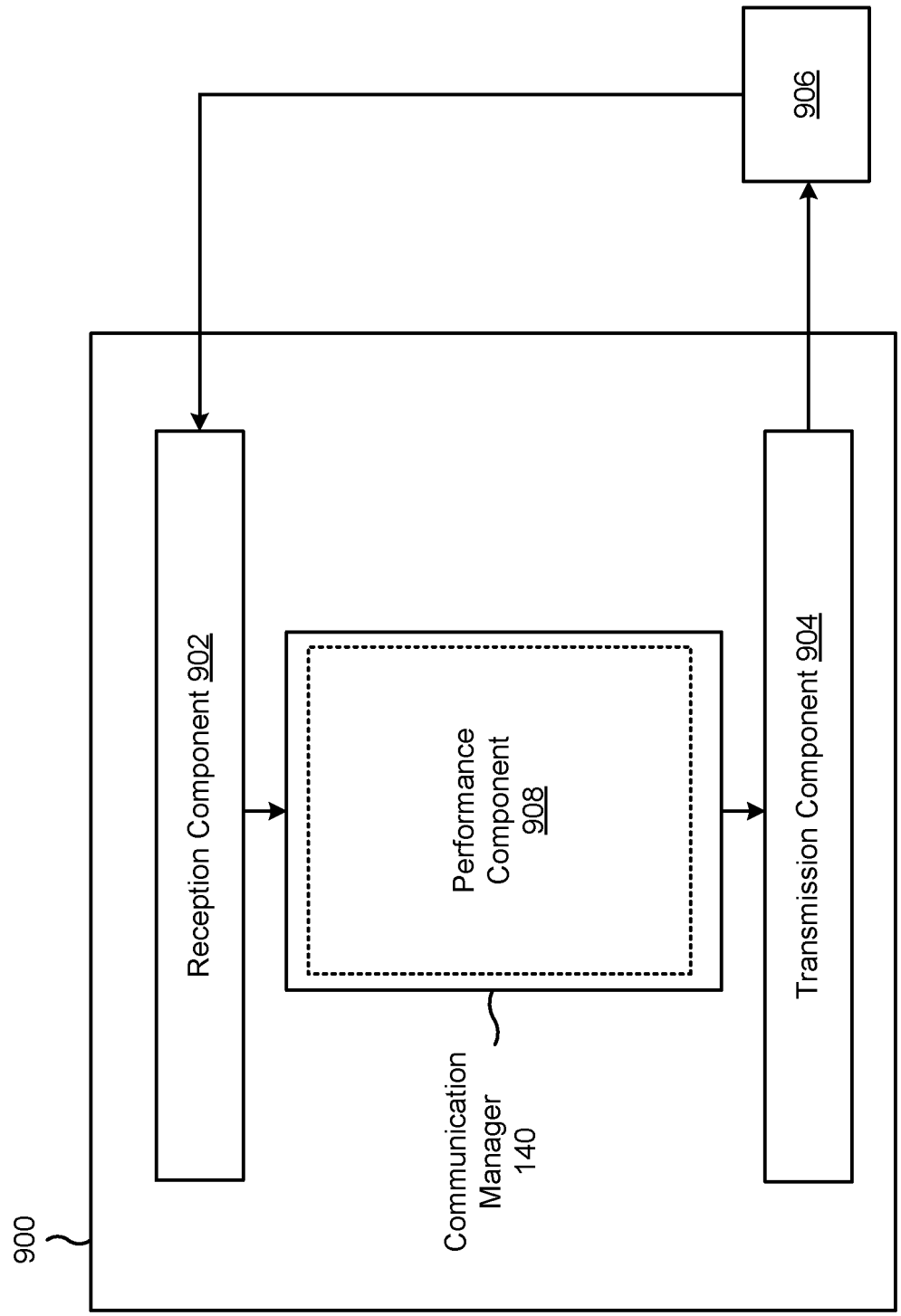
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a performance component 908, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network entity, a configuration that indicates one or more types associated with an initial access or a cell reselection. The performance component 908 may perform, to the network entity, the initial access or the cell reselection based at least in part on the configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
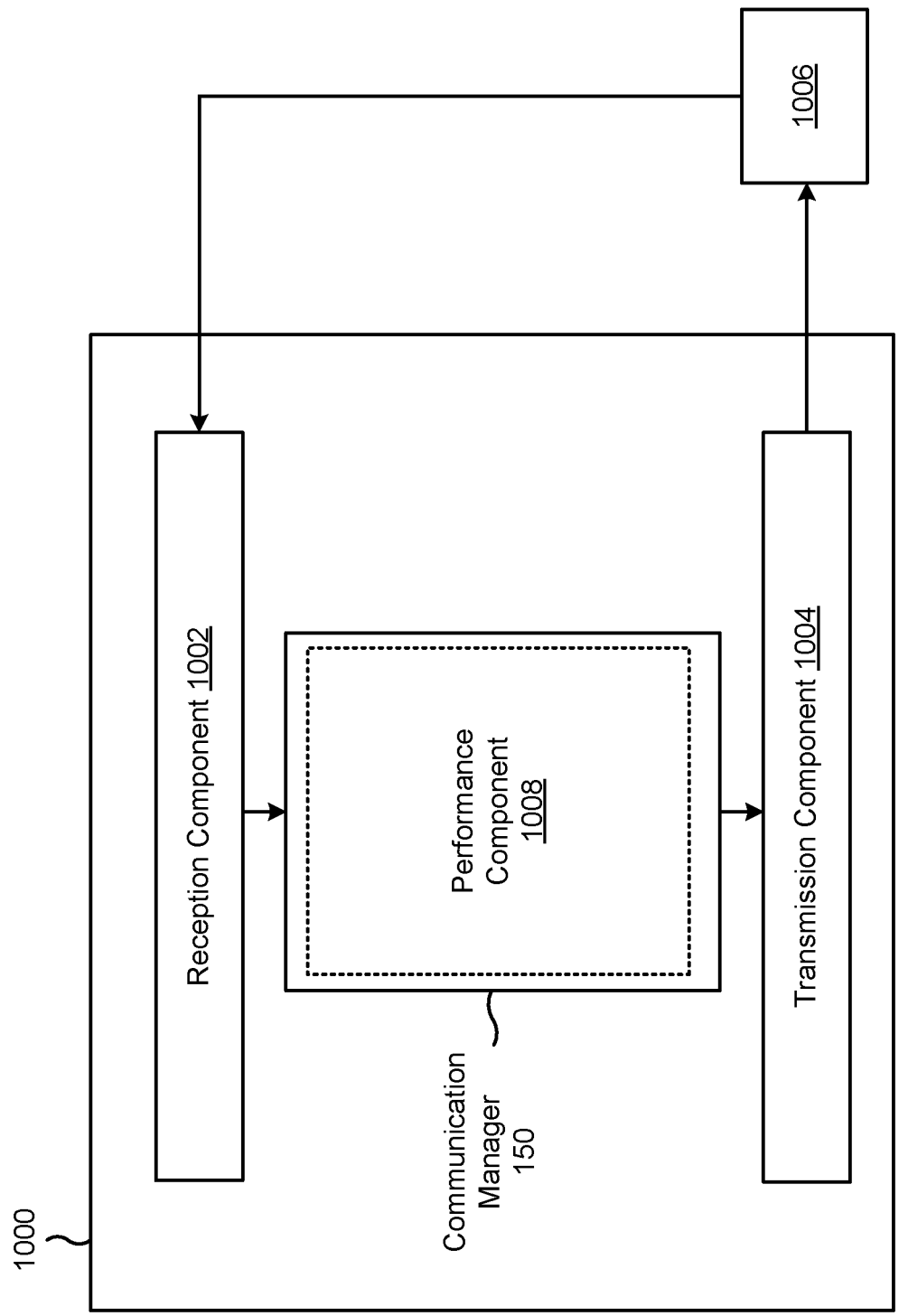

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a performance component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit, to a UE, a configuration that indicates one or more types associated with an initial access or a cell reselection. The performance component 1008 may perform, for the UE, the initial access or the cell reselection based at least in part on the configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network entity, a configuration that indicates one or more types associated with an initial access or a cell reselection; and performing, to the network entity, the initial access or the cell reselection based at least in part on the configuration.

Aspect 2: The method of Aspect 1, wherein: the one or more types includes a first type associated with a flexible configuration for one or more channels, wherein the flexible configuration is associated with dynamic resources for the one or more channels; and the one or more types includes a second type associated with a static configuration for the one or more channels, wherein the static configuration is associated with preconfigured or specified resources for the one or more channels.

Aspect 3: The method of Aspect 2, wherein the one or more channels include a random access channel, a physical downlink control channel, or a system information block type 1 physical downlink shared channel.

Aspect 4: The method of any of Aspects 1 through 3, wherein the configuration indicates, for the one or more types associated with the initial access or the cell reselection, a type of system information.

Aspect 5: The method of Aspect 4, wherein the type of system information is one of: fully static system information that involves no system information block type 1 (SIB1); partially static system information that involves a partial SIB1; or flexible system information that involves a full SIB1.

Aspect 6: The method of any of Aspects 1 through 5, wherein the configuration indicates, for the one or more types associated with the initial access or the cell reselection, a non-dedicated control resource set 0 and a non-dedicated system information block type 1 physical downlink shared channel that is periodically transmitted by the network entity.

Aspect 7: The method of any of Aspects 1 through 6, wherein the configuration indicates, for the one or more types associated with the initial access or the cell reselection, a non-dedicated control resource set 0 and a dedicated system information block type 1 physical downlink shared channel.

Aspect 8: The method of any of Aspects 1 through 7, wherein the configuration indicates, for the one or more types associated with the initial access or the cell reselection, a dedicated control resource set 0 and a dedicated system information block type 1 physical downlink shared channel.

Aspect 9: The method of any of Aspects 1 through 8, wherein the configuration is received from the network entity via one of: a synchronization signal block; a control resource set; system information; or dedicated signaling.

Aspect 10: The method of any of Aspects 1 through 9, wherein the one or more types associated with the initial access or the cell reselection are based at least in part on a UE capability.

Aspect 11: The method of any of Aspects 1 through 10, wherein the one or more types associated with the initial access or the cell reselection are applicable to a plurality of UEs.

Aspect 12: A method of wireless communication performed by a network entity, comprising: transmitting, to a user equipment (UE), a configuration that indicates one or more types associated with an initial access or a cell reselection; and performing, for the UE, the initial access or the cell reselection based at least in part on the configuration.

Aspect 13: The method of Aspect 12, wherein: the one or more types includes a first type associated with a flexible configuration for one or more channels, wherein the flexible configuration is associated with dynamic resources for the one or more channels; and the one or more types includes a second type associated with a static configuration for the one or more channels, wherein the static configuration is associated with preconfigured or specified resources for the one or more channels.

Aspect 14: The method of Aspect 13, wherein the one or more channels include a random access channel, a physical downlink control channel, or a system information block type 1 physical downlink shared channel.

Aspect 15: The method of any of Aspects 12 through 14, wherein the configuration indicates, for the one or more types associated with the initial access or the cell reselection: a non-dedicated control resource set (CORESET) 0 and a non-dedicated system information block type 1 (SIB1) physical downlink shared channel (PDSCH) that is periodically transmitted by the network entity; a non-dedicated CORESET 0 and a dedicated PDSCH; or a dedicated CORESET 0 and a dedicated SIB1 PDSCH.

Aspect 16: An apparatus for wireless communication at a device, comprising a processor; memory coupled with the processor; and instructions stored in the memory and executable by the processor to cause the apparatus to perform the method of one or more of Aspects 1-11.

Aspect 17: A device for wireless communication, comprising a memory and one or more processors coupled to the memory, the one or more processors configured to perform the method of one or more of Aspects 1-11.

Aspect 18: An apparatus for wireless communication, comprising at least one means for performing the method of one or more of Aspects 1-11.

Aspect 19: A non-transitory computer-readable medium storing code for wireless communication, the code comprising instructions executable by a processor to perform the method of one or more of Aspects 1-11.

Aspect 20: A non-transitory computer-readable medium storing a set of instructions for wireless communication, the set of instructions comprising one or more instructions that, when executed by one or more processors of a device, cause the device to perform the method of one or more of Aspects 1-11.

Aspect 21: An apparatus for wireless communication at a device, comprising a processor; memory coupled with the processor; and instructions stored in the memory and executable by the processor to cause the apparatus to perform the method of one or more of Aspects 12-15.

Aspect 22: A device for wireless communication, comprising a memory and one or more processors coupled to the memory, the one or more processors configured to perform the method of one or more of Aspects 12-15.

Aspect 23: An apparatus for wireless communication, comprising at least one means for performing the method of one or more of Aspects 12-15.

Aspect 24: A non-transitory computer-readable medium storing code for wireless communication, the code comprising instructions executable by a processor to perform the method of one or more of Aspects 12-15.

Aspect 25: A non-transitory computer-readable medium storing a set of instructions for wireless communication, the set of instructions comprising one or more instructions that, when executed by one or more processors of a device, cause the device to perform the method of one or more of Aspects 12-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
     receive, from a network entity, a configuration that indicates one or more types associated with an initial access or a cell reselection,
       wherein the one or more types includes a first type associated with a flexible configuration for one or more channels, wherein the flexible configuration is associated with dynamic resources for the one or more channels, and
       wherein the one or more types includes a second type associated with a static configuration for the one or more channels, wherein the static configuration is associated with preconfigured or specified resources for the one or more channels; and
     perform, to the network entity, the initial access or the cell reselection based at least in part on the configuration.

2. The apparatus of claim 1, wherein the one or more channels include a random access channel, a physical downlink control channel, or a system information block type 1 physical downlink shared channel.

3. The apparatus of claim 1, wherein the configuration indicates, for the one or more types associated with the initial access or the cell reselection, a type of system information.

4. The apparatus of claim 3, wherein the type of system information is one of:
   fully static system information that involves no system information block type 1 (SIB1);
   partially static system information that involves a partial SIB1; or
   flexible system information that involves a full SIB1.

5. The apparatus of claim 1, wherein the configuration indicates, for the one or more types associated with the initial access or the cell reselection, a non-dedicated control resource set 0 and a non-dedicated system information block type 1 physical downlink shared channel that is periodically transmitted by the network entity.

6. The apparatus of claim 1, wherein the configuration indicates, for the one or more types associated with the initial access or the cell reselection, a non-dedicated control resource set 0 and a dedicated system information block type 1 physical downlink shared channel.

7. The apparatus of claim 1, wherein the configuration indicates, for the one or more types associated with the initial access or the cell reselection, a dedicated control resource set 0 and a dedicated system information block type 1 physical downlink shared channel.

8. The apparatus of claim 1, wherein the configuration is received from the network entity via one of:
   a synchronization signal block;
   a control resource set;
   system information; or
   dedicated signaling.

9. The apparatus of claim 1, wherein the one or more types associated with the initial access or the cell reselection are based at least in part on a UE capability.

10. The apparatus of claim 1, wherein the one or more types associated with the initial access or the cell reselection are applicable to a plurality of UEs.

11. An apparatus for wireless communication at a network entity, comprising:
    a memory; and
    one or more processors, coupled to the memory, configured to:

transmit, to a user equipment (UE), a configuration that indicates one or more types associated with an initial access or a cell reselection,
wherein the one or more types includes a first type associated with a flexible configuration for one or more channels, wherein the flexible configuration is associated with dynamic resources for the one or more channels, and
wherein the one or more types includes a second type associated with a static configuration for the one or more channels, wherein the static configuration is associated with preconfigured or specified resources for the one or more channels; and
perform, for the UE, the initial access or the cell reselection based at least in part on the configuration.

12. The apparatus of claim 11, wherein the one or more channels include a random access channel, a physical downlink control channel, or a system information block type 1 physical downlink shared channel.

13. The apparatus of claim 11, wherein the configuration indicates, for the one or more types associated with the initial access or the cell reselection:
a non-dedicated control resource set (CORESET) 0 and a non-dedicated system information block type 1 (SIB1) physical downlink shared channel (PDSCH) that is periodically transmitted by the network entity;
a non-dedicated CORESET 0 and a dedicated PDSCH; or
a dedicated CORESET 0 and a dedicated SIB1 PDSCH.

14. A method of wireless communication performed by a user equipment (UE), comprising:
receiving, from a network entity, a configuration that indicates one or more types associated with an initial access or a cell reselection,
wherein the one or more types includes a first type associated with a flexible configuration for one or more channels, wherein the flexible configuration is associated with dynamic resources for the one or more channels, and
wherein the one or more types includes a second type associated with a static configuration for the one or more channels, wherein the static configuration is associated with preconfigured or specified resources for the one or more channels; and
performing, to the network entity, the initial access or the cell reselection based at least in part on the configuration.

15. The method of claim 14, wherein the one or more channels include a random access channel, a physical downlink control channel, or a system information block type 1 physical downlink shared channel.

16. The method of claim 14, wherein the configuration indicates, for the one or more types associated with the initial access or the cell reselection, a type of system information.

17. The method of claim 16, wherein the type of system information is one of:
fully static system information that involves no system information block type 1 (SIB1);
partially static system information that involves a partial SIB1; or
flexible system information that involves a full SIB1.

18. The method of claim 14, wherein the configuration indicates, for the one or more types associated with the initial access or the cell reselection, a non-dedicated control resource set 0 and a non-dedicated system information block type 1 physical downlink shared channel that is periodically transmitted by the network entity.

19. The method of claim 14, wherein the configuration indicates, for the one or more types associated with the initial access or the cell reselection, a non-dedicated control resource set 0 and a dedicated system information block type 1 physical downlink shared channel.

20. The method of claim 14, wherein the configuration indicates, for the one or more types associated with the initial access or the cell reselection, a dedicated control resource set 0 and a dedicated system information block type 1 physical downlink shared channel.

21. The method of claim 14, wherein the configuration is received from the network entity via one of:
a synchronization signal block;
a control resource set;
system information; or
dedicated signaling.

22. The method of claim 14, wherein the one or more types associated with the initial access or the cell reselection are based at least in part on a UE capability.

23. The method of claim 14, wherein the one or more types associated with the initial access or the cell reselection are applicable to a plurality of UEs.

24. A method of wireless communication performed by a network entity, comprising:
transmitting, to a user equipment (UE), a configuration that indicates one or more types associated with an initial access or a cell reselection,
wherein the one or more types includes a first type associated with a flexible configuration for one or more channels, wherein the flexible configuration is associated with dynamic resources for the one or more channels, and
wherein the one or more types includes a second type associated with a static configuration for the one or more channels, wherein the static configuration is associated with preconfigured or specified resources for the one or more channels; and
performing, for the UE, the initial access or the cell reselection based at least in part on the configuration.

25. The method of claim 24, wherein the one or more channels include a random access channel, a physical downlink control channel, or a system information block type 1 physical downlink shared channel.

26. The method of claim 24, wherein the configuration indicates, for the one or more types associated with the initial access or the cell reselection:
a non-dedicated control resource set (CORESET) 0 and a non-dedicated system information block type 1 (SIB1) physical downlink shared channel (PDSCH) that is periodically transmitted by the network entity;
a non-dedicated CORESET 0 and a dedicated PDSCH; or
a dedicated CORESET 0 and a dedicated SIB1 PDSCH.

27. The apparatus of claim 11, wherein the configuration indicates, for the one or more types associated with the initial access or the cell reselection, a type of system information.

28. The apparatus of claim 27, wherein the type of system information is one of:
fully static system information that involves no system information block type 1 (SIB1);
partially static system information that involves a partial SIB1; or
flexible system information that involves a full SIB1.

29. The method of claim 24, wherein the configuration indicates, for the one or more types associated with the initial access or the cell reselection, a type of system information.

30. The method of claim 29, wherein the type of system information is one of:
   fully static system information that involves no system information block type 1 (SIB1);
   partially static system information that involves a partial SIB1; or
   flexible system information that involves a full SIB1.

* * * * *